(12) United States Patent
Eriksson et al.

(10) Patent No.: US 9,067,579 B2
(45) Date of Patent: Jun. 30, 2015

(54) METHOD AND SYSTEM FOR CONTROLLING A VEHICLE POWERTRAIN

(75) Inventors: Anders Eriksson, Torslanda (SE); Niklas Öberg, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 294 days.

(21) Appl. No.: 13/062,244

(22) PCT Filed: Oct. 10, 2008

(86) PCT No.: PCT/SE2008/000587
§ 371 (c)(1),
(2), (4) Date: Mar. 4, 2011

(87) PCT Pub. No.: WO2010/041989
PCT Pub. Date: Apr. 15, 2010

(65) Prior Publication Data
US 2011/0190993 A1     Aug. 4, 2011

(51) Int. Cl.
*B60W 10/00* (2006.01)
*F16H 59/74* (2006.01)
(Continued)

(52) U.S. Cl.
CPC .............. *B60W 10/02* (2013.01); *B60W 10/11* (2013.01); *B60W 40/02* (2013.01); *B60W 50/082* (2013.01); *B60W 2510/0638* (2013.01);
(Continued)

(58) Field of Classification Search
CPC ... F16H 59/58; F16H 59/66; F16H 2059/142; F16H 61/0204; F16H 61/0213; F16H 61/16; F16H 61/66; F16H 61/66209; F16H 61/66259; F16H 61/68; F16H 2061/0227; F16H 2061/0239; B60W 10/02; B60W 10/10; B60W 10/11

USPC .............. 701/51, 53–56, 61, 65, 95; 477/107, 477/108, 110, 111, 115, 120
See application file for complete search history.

(56) References Cited

U.S. PATENT DOCUMENTS

| 4,569,255 A | 2/1986 | Holmes |
| 4,841,815 A | 6/1989 | Takahashi |

(Continued)

FOREIGN PATENT DOCUMENTS

| DE | 19623816 A1 | 12/1996 | |
| WO | WO 2007/067115 A1 * | 6/2007 | .............. F16H 61/02 |

OTHER PUBLICATIONS

JP 61048652 A (Toyota Motor Corp) Mar. 10, 1986 abstract.
(Continued)

*Primary Examiner* — Jack W Keith
*Assistant Examiner* — Chuong P Nguyen
(74) *Attorney, Agent, or Firm* — WRB-IP LLP

(57) ABSTRACT

A method and system for controlling a powertrain in a vehicle includes steps including registering a road condition. If the registered road condition corresponds to normal road conditions then a first gear selection control algorithm is used intended for driving the vehicle in a normal mode corresponding to the conditions on an ordinary road. If the registered road condition corresponds to soft surface road conditions then a second gear selection control algorithm is used intended for driving the vehicle in a soft surface mode corresponding to the conditions on an soft surface road. In this way, a vehicle can be adapted to be provided with an AMT to work in a satisfactorily way under an increased diversity of conditions.

20 Claims, 5 Drawing Sheets

(51) Int. Cl.
- *B60W 10/02* (2006.01)
- *B60W 10/11* (2012.01)
- *B60W 40/02* (2006.01)
- *B60W 50/08* (2012.01)
- *F16H 59/66* (2006.01)
- *F16H 61/02* (2006.01)

(52) U.S. Cl.
CPC ....... *B60W 2520/10* (2013.01); *B60W 2530/16* (2013.01); *B60W 2540/10* (2013.01); *F16H 59/66* (2013.01); *F16H 61/0213* (2013.01); *F16H 2061/0227* (2013.01)

(56) References Cited

U.S. PATENT DOCUMENTS

| | | | |
|---|---|---|---|
| 4,922,428 A | | 5/1990 | Takahashi |
| 4,941,096 A | * | 7/1990 | Ito et al. .................. 701/55 |
| 5,001,943 A | | 3/1991 | Fujita |
| 5,060,746 A | | 10/1991 | Nobumoto et al. |
| 5,103,398 A | * | 4/1992 | Akiyama .................. 701/54 |
| 5,361,207 A | * | 11/1994 | Hayafune .................. 701/57 |
| 5,410,476 A | * | 4/1995 | Iizuka .................. 701/56 |
| 5,679,092 A | * | 10/1997 | Otsubo et al. .................. 477/97 |
| 5,829,544 A | | 11/1998 | Ishizu |
| 5,911,771 A | * | 6/1999 | Reichart et al. .................. 701/65 |
| 5,947,861 A | * | 9/1999 | Nobumoto .................. 477/37 |
| 5,983,154 A | * | 11/1999 | Morisawa .................. 701/56 |
| 6,125,321 A | * | 9/2000 | Tabata et al. .................. 701/97 |
| 6,182,000 B1 | * | 1/2001 | Ohta et al. .................. 701/55 |
| 6,519,520 B2 | | 2/2003 | Shin |
| 6,626,797 B2 | * | 9/2003 | Shiiba et al. .................. 477/97 |
| 6,669,599 B2 | * | 12/2003 | Iwase et al. .................. 477/97 |
| 7,300,384 B2 | * | 11/2007 | Eriksson et al. .............. 477/180 |
| 7,505,842 B2 | * | 3/2009 | Luh .................. 701/55 |
| 7,912,615 B2 | * | 3/2011 | Lindgren et al. .................. 701/55 |
| 2002/0013650 A1 | * | 1/2002 | Kusafuka et al. .................. 701/51 |
| 2004/0260443 A1 | * | 12/2004 | Berglund et al. .................. 701/51 |
| 2006/0148615 A1 | * | 7/2006 | Steen et al. .................. 477/111 |
| 2006/0155447 A1 | | 7/2006 | Uken et al. |
| 2007/0254774 A1 | | 11/2007 | Poisson |
| 2008/0234905 A1 | | 9/2008 | Steen et al. |

OTHER PUBLICATIONS

Supplementary European Search Report European Application No. EP 08 81 3380.

International Search Report for corresponding International Application PCT/SE2008/000587.

International Preliminary Report on Patentability for corresponding International Application PCT/SE2008/000587.

\* cited by examiner

METHOD AND SYSTEM FOR CONTROLLING A VEHICLE POWERTRAIN

BACKGROUND AND SUMMARY

The invention relates to an Automatic Manual Transmission (AMT) and the control of such an AMT. In particular the invention relates to a map for control of the gear selection in such an AMT.

The use of Automatic Manual Transmissions (AMT) has been increasingly common during the last years and is today a common feature in many vehicles. The inclusion of an automatic gear shift selection has made the driving more easily for a driver who instead of putting an effort on selecting the right gear may concentrate on the driving and the surrounding traffic. In particular for heavy duty vehicles, an automatic shift system such as AMT has been of a great value.

In order to control the automatic system, a number of control strategies and shift pattern maps have been suggested. In U.S. Pat. No. 5,067,374 and U.S. Pat. No. 4,841,815 is described the use of fuzzy logic in order to select a gear. U.S. Pat. No. 4,922,428 describes a learning system for improving a gear selection pattern. US 2007/0254774 describes a system for selecting between a manual shift mode and an automatic shift mode or different automatic shift modes. It is also known to use different gear shift patterns depending on different parameters and this is for exampled disclosed in U.S. Pat. No. 6,519,520; US 2006/0155447; U.S. Pat. No. 5,911,771 or U.S. Pat. No. 6,182,000.

Even though the above documents provides different systems for control of an automatic transmission, there are still certain desires not fulfilled concerning these kind of systems to perform well over a wide variety of operating conditions. Hence, it is desirable to adapt a vehicle provided with an AMT to work in a satisfactorily way under an increased diversity of conditions.

The present invention provides, according to an aspect thereof, a new powertrain system for a vehicle and a method for improved control of an Automatic Manual Transmission (AMT). Hence, an aspect of the invention relates to a powertrain for a vehicle and a system according to an aspect of the invention that comprises

- an automated master clutch,
- a stepped gearbox and
- a control unit adapted to control said master clutch and said stepped gearbox.

The control unit is programmed to generate a control signal indicating a desired gear selection. The control unit comprises at least two different sets of gear selection control algorithms for generating the gear selection control signal and the different control algorithms are programmed to generate different gear selection control signals based on input data, i.e. the same input data will make the gear selection control signal differ for at least one state of the input parameters. The control unit is further connected to a gear selection control algorithm selector which indicates which set of gear selection control algorithm that is to be used by the control unit. Among the at least two different gear selection control algorithms are at least a first gear selection control algorithm intended to be used when driving said vehicle in a normal mode corresponding to the conditions on an ordinary road, e.g. this is the control strategy normally used by the vehicle if not any particular strategy or program is selected.

According to the present invention, the gear selection control algorithms comprises a second gear selection control algorithm intended to be used when driving said vehicle in a soft surface mode. By the term "soft surface mode" is for example included when the vehicle is driving in sand, e.g. in the desert. There may of course be other similar conditions, at least with respect to the properties or conditions for the powertrain and the wheels, when this mode also may be used, e.g. driving in loose snow or wet mud. Hence, this mode is intended to include different kind of conditions when there is a soft surface, e.g. a surface comprising some kind of particulate matter or loose material, such that the grip for the traction wheels is lower than usual and, likewise, the rolling property is also lower than usual due to the inherent property of a loose material to let the wheels "sink" into the surface and while the surface material will not keep together when a force is transmitted to the surface, e.g. from the traction wheels. Hence, there is a reason for changing the control system or gear shift control signals for different conditions since the normal control modes does not satisfactorily manage the powertrain system in certain, extreme conditions. For example, when a vehicle, e.g. a heavy duty vehicle provided with an AMT, is driving in the desert and is climbing a hill, the running resistance is far more than when climbing for example an equally inclined hill having an asphalt surface. If no adaptation is made due to the changed condition, the vehicle will use a too high gear and will not be able to climb the hill as desired. When the gear is shifted down, it is very likely that the wheels start to slip, at least for a short while since the loose sand easily allow a spin and as a result of this, the gearbox may change up again to the undesired, higher gear. This scenario may occur several times and the vehicle will essentially not move forward and, if the hill is steep enough, probably stop completely. Hence, there is a need for another shift strategy mode adapted to these conditions in order to allow a vehicle provided with an AMT to travel safe and smooth in an increased variety of environments.

In one embodiment of an aspect of the invention, the second gear selection control algorithm is programmed to perform a shift to a selected higher gear at a higher engine speed than when the normal mode gear selection control algorithm is used. If for example a gear shift normally is predicted and performed at for instance 1600 rpm, the level for shifting may be raised to 1900 rpm.

According to still another embodiment, which may be used alone or in combination with the foregoing embodiment, the gear shift may include smaller steps. If for example in a gearbox equipped with 12 forward gears the gears are shifted stepwise using the gear steps 2-5-8-10-11-12 according to a normal gear shifting mode when shifting up from gear step 2 to 12, the gear steps used when driving in the soft surface mode may for example be 2-4-6-8-9-10-11-12 when using the soft surface mode. Hence, more gear shifts are included in the soft surface gear shift pattern when shifting from the lowest possible gear to the highest possible gear compared to the normal gear shifting pattern and when in both said gear shifting patterns the lowest and highest gear are the same. In the example above, two extra gear shifts are used in the soft surface mode compared to the normal mode when shifting from the 2nd to the 12th gear.

At a first glance, the suggested shift pattern may seem to be similar to shift patterns for a sport mode or the like for a vehicle. However, there are some basic differences between the soft surface mode and such a sport mode. In the soft surface mode the shift pattern is optimized to be able to provide a sufficiently high driving force in order to avoid that the vehicle stops or needs to shift back to a lower gear. In the sport mode, the vehicle is optimized to change gears so as to provide optimal acceleration. Furthermore, the intended use of this soft surface shift mode pattern is directed to heavy vehicles and utility vehicles such as trucks and the like vehicles which have a highly complex powertrain and gearbox comprising a split gearing, a main gearbox and a range gear which is controlled by an ECU to automatically shift the gears. A sport mode is usually provided in standard vehicles such as cars having a different gearbox and a different intended use as a family vehicle.

In still another embodiment, the gear selection control algorithm may also be dependent on the steering angle such that there is an increased engine speed limit for changing a gear when there is an increased steering wheel angle. In particular, an up shift may not be allowed when the steering angle is above a predefined limit. Another possibility is to demand a downshift if the steering angle is above a certain limit. Hence, the steering angle may very well be used as one of several input parameters which together define the soft surface shift control strategy. For example a steering angle corresponding to a turning radius of 100 meters can give zero increase of the engine speed limit for changing a gear. Whereas a steering angle corresponding to a turning radius of 20 meters can give 200 rpm increase of the engine speed limit for changing a gear.

According to one embodiment, the gear selection control algorithm selector is operated manually such that said second gear selection control algorithm, i.e. the soft surface mode, may be manually selected. It may of course also be an automatic turn on/off feature depending on exterior conditions and vehicle features or a combination of these systems, e.g. an auto select mode or a mode where the driver intentionally selects which gear shift or gear selection mode that is to be used.

The control unit may be connected to or comprise a look up table or a mathematical formula to be used for generating the gear selection control signal.

Furthermore, according to a further embodiment of an aspect of the invention, the system may comprise also the feature of estimating or computing a travel resistance value from data retrieved from relevant sensors known in the art such that a control system in the vehicle may predict when the powertrain shall be controlled by the second gear selection control algorithm, i.e. the soft surface mode, and when it shall be controlled by another gear selection control algorithm, e.g. a normal mode. The selection of which mode to be selected may be made by setting a level of the travel resistance above which the soft surface mode will be selected if the travel resistance has been above that level for a certain time. The travel resistance can for example be estimated by measuring tractive force (amount of injected fuel or torque sensor), vehicle mass and vehicle acceleration and using the known equation Ftractive−Fresistance=m*a, where Ftractive is tractive force and Fresistance is travel resistance, m is vehicle mass and a is vehicle acceleration. The estimated value for the travel resistance can be compared with a value for a climbing force, which can be estimated using a road inclination sensor, in order to obtain a better value for the travel resistance.

According to still another embodiment, which may be used together with the earlier embodiments, quicker torque ramps at the gear shifts are performed when the powertrain is controlled according to the second gear selection control algorithm than when controlled by the first gear selection control algorithm. This feature may be used since the surface, e.g. loose sand, will not grip to hard and even though a gear is engaged rather quickly, the soft surface will allow a certain slip and there will be a rather smooth reaction force working on the powertrain and the gearbox. The quicker torque ramps will reduce the shift time, i.e. the time when there is an interruption of power to the traction wheels, and will therefore provide a better chance to succeed when performing an upshift in steep conditions.

The soft surface mode shall also allow a rather large slip before shifting down and the soft surface mode shall not be provided with features reacting to a slip or at least allow a slip of the wheels which is far more than is allowed in a normal mode. This is due to the fact that it is expected that the wheels will slip when there is a soft surface.

The method according to an aspect of the invention is a method for controlling a powertrain for a vehicle. The method is characterized in the steps of:
   registering a road condition;
   if said registered road condition corresponds to normal road conditions then a first gear selection control algorithm is used intended for driving said vehicle in a normal mode corresponding to the conditions on an ordinary road;
   if said registered road condition corresponds to soft surface road conditions then a second gear selection control algorithm is used intended for driving said vehicle in a soft surface mode corresponding to the conditions on an soft surface road.

Further embodiments of the method correspond to said embodiments of the power train system.

The invention is further directed, according to an aspect thereof, to a vehicle comprising such a powertrain as described above. In particular, this powertrain is suitable for a heavy duty vehicle such as a truck.

One embodiment of an aspect of the invention comprises said powertrain a split gearbox, a main gearbox and a range gear.

In addition, the invention is directed, according to an aspect thereof, to a computer program, computer program product and a storage medium to be used with a computer for executing the gear shift selection according to the invention.

DETAILED DESCRIPTION

Figure 1:
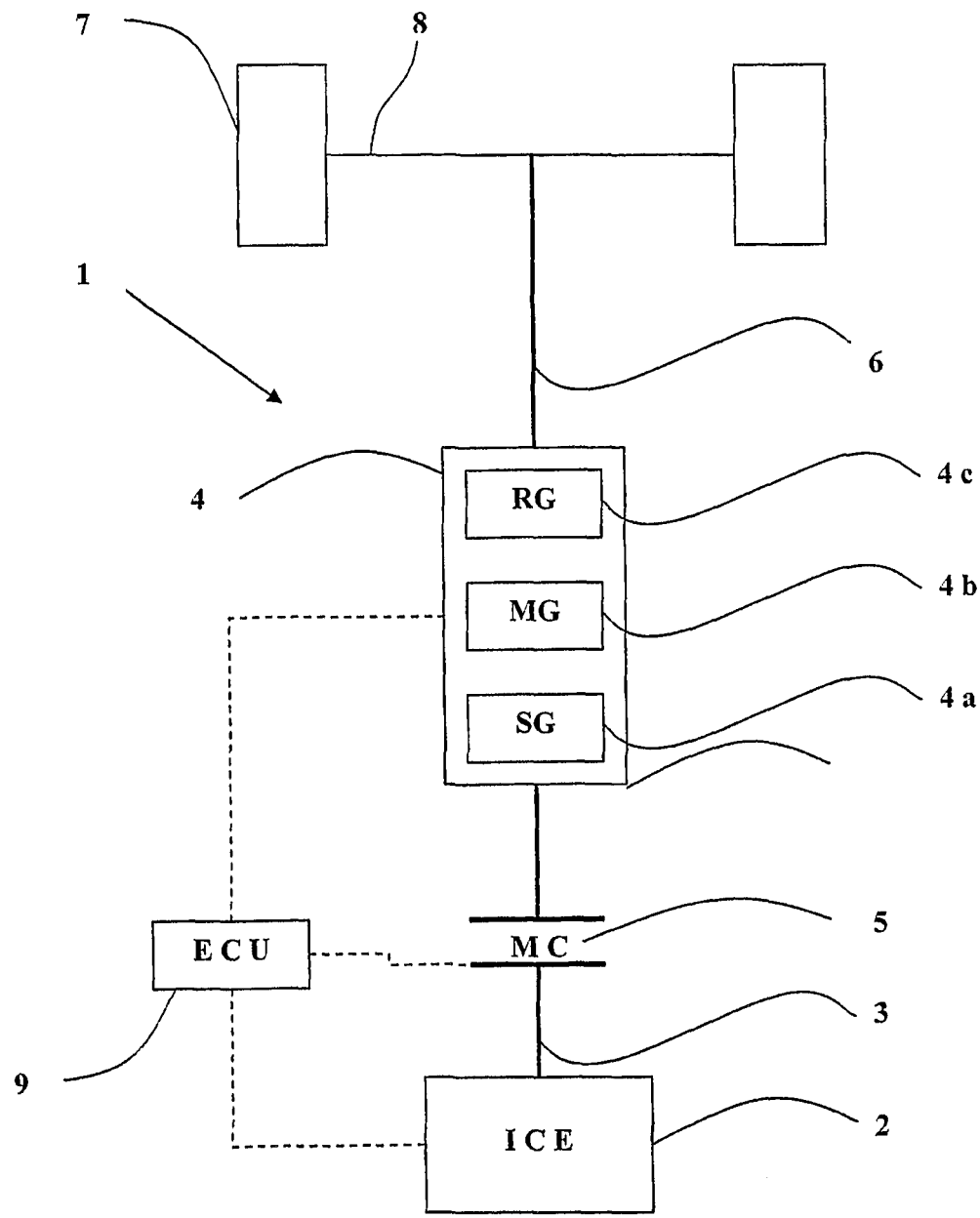
FIG. 1 Describes a drive train system suitable for the present invention
Figure 6:
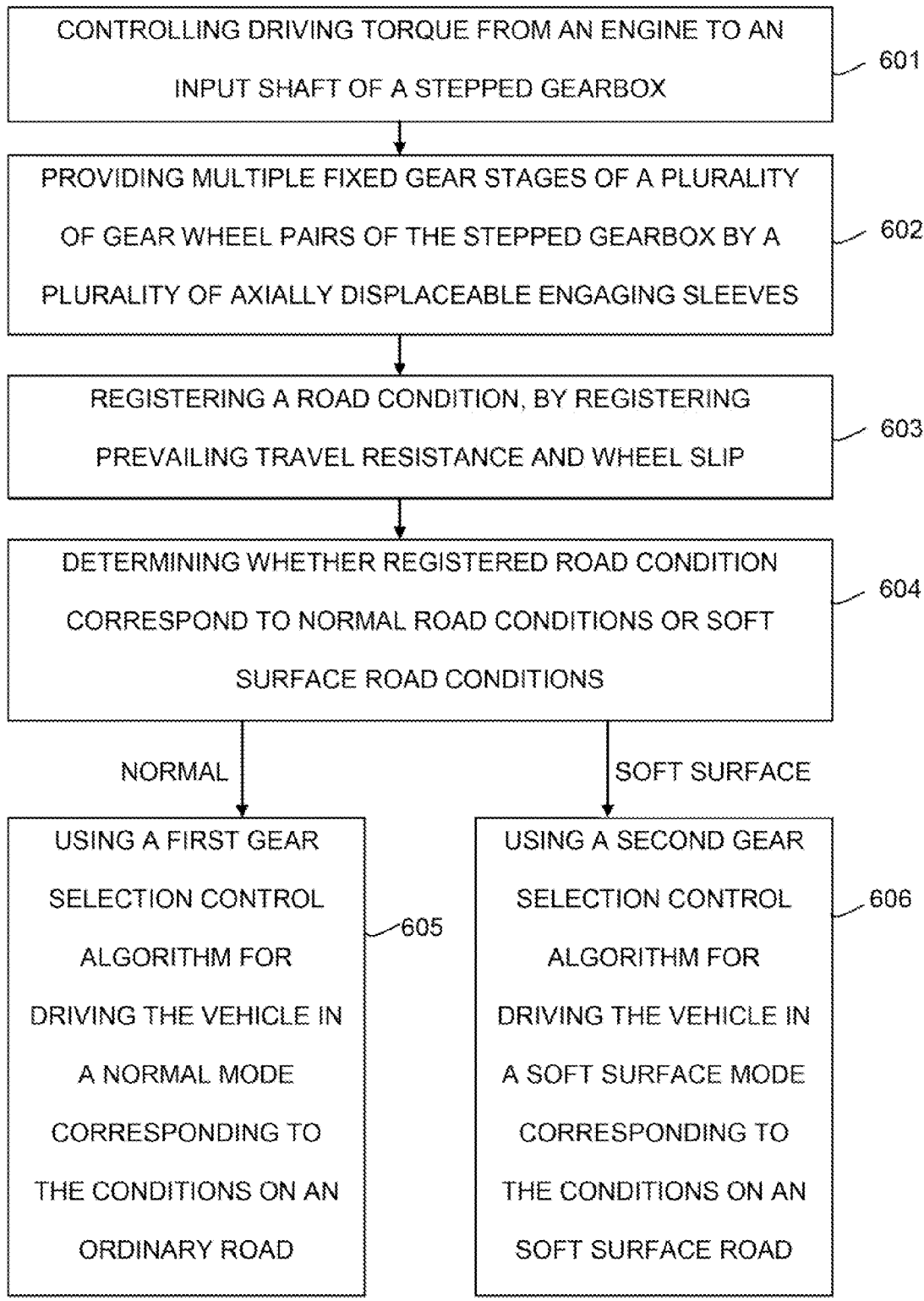
FIG. 6 shows a flow chart illustrating steps according to an aspect of the present invention.

A vehicle comprising a drive train system 1 according to the invention is shown in FIG. 1, and a method according to an aspect of the invention is shown in FIG. 6. The system comprises an Internal Combustion Engine (ICE) 2 provided with an output shaft 3 connected to a Mechanical Transmission (MT) 4 via a Main Clutch (or Master Clutch) (MC) 5. The Mechanical Transmission 4 comprises a Split Gearing 4a, a Main Gearbox 4b and a Range Gearing 4c. The MT 4 is further provided with an output shaft 6 which is connected to the driving wheels 7 of the vehicle via a driven shaft 8. The system is controlled by an Electronic Control Unit (ECU) 9 which is connected to the ICE 2, the MC 5 and the MT 4.

According to the invention, to control driving torque from the ICE 2 to the MT 4 (step 601 in FIG. 6) the ECU 9 is programmed to perform a specific gear change strategy depending on the input signals which either may be an manually input signal indicating which strategy a driver wants or a gear shift strategy which is selected due to sensed data which either are used to select a gear shift pattern from a look up table or indicating a certain algorithm to be used. The system is able to provide at least two different gear shift control strategies corresponding to a normal mode (step 605 in FIG. 6) and a soft surface shift mode (step 606 in FIG. 6). Said ECU 9 can be programmed to register prevailing travel resistance and wheel slip (step 603 in FIG. 6). If the travel resistance is higher than a predetermined value and if the wheel slip is higher than a predetermined value (step 604 in FIG. 6) then said ECU can be programmed to control according to said soft surface mode (step 606 in FIG. 6).

In case the soft surface mode is selected, either manually or by being computed by the use of relevant parameters, a gear shift pattern is used which is adapted to provide the desired power when driving on a soft surface made of loosely attached particles or the like material. This may for example be the case when driving in sand on desert road. The shift pattern is thus adapted to shift up gears at a higher rpm than what is usually used in the normal mode when shifting gears or to make a smaller step when shifting up. The method may of course comprise a combination of these measures. The purpose of this gear shift strategy is to provide more power before shifting such that the driving force will be sufficient after shifting gears even if the vehicle is driving on a loose surface. The problem of managing to drive in such a loose material is specifically relevant to heavy duty vehicles which may weigh a lot and easily penetrate the soft surface with its wheels thus resulting in a significant increase in the travel resistance.

Figure 2:
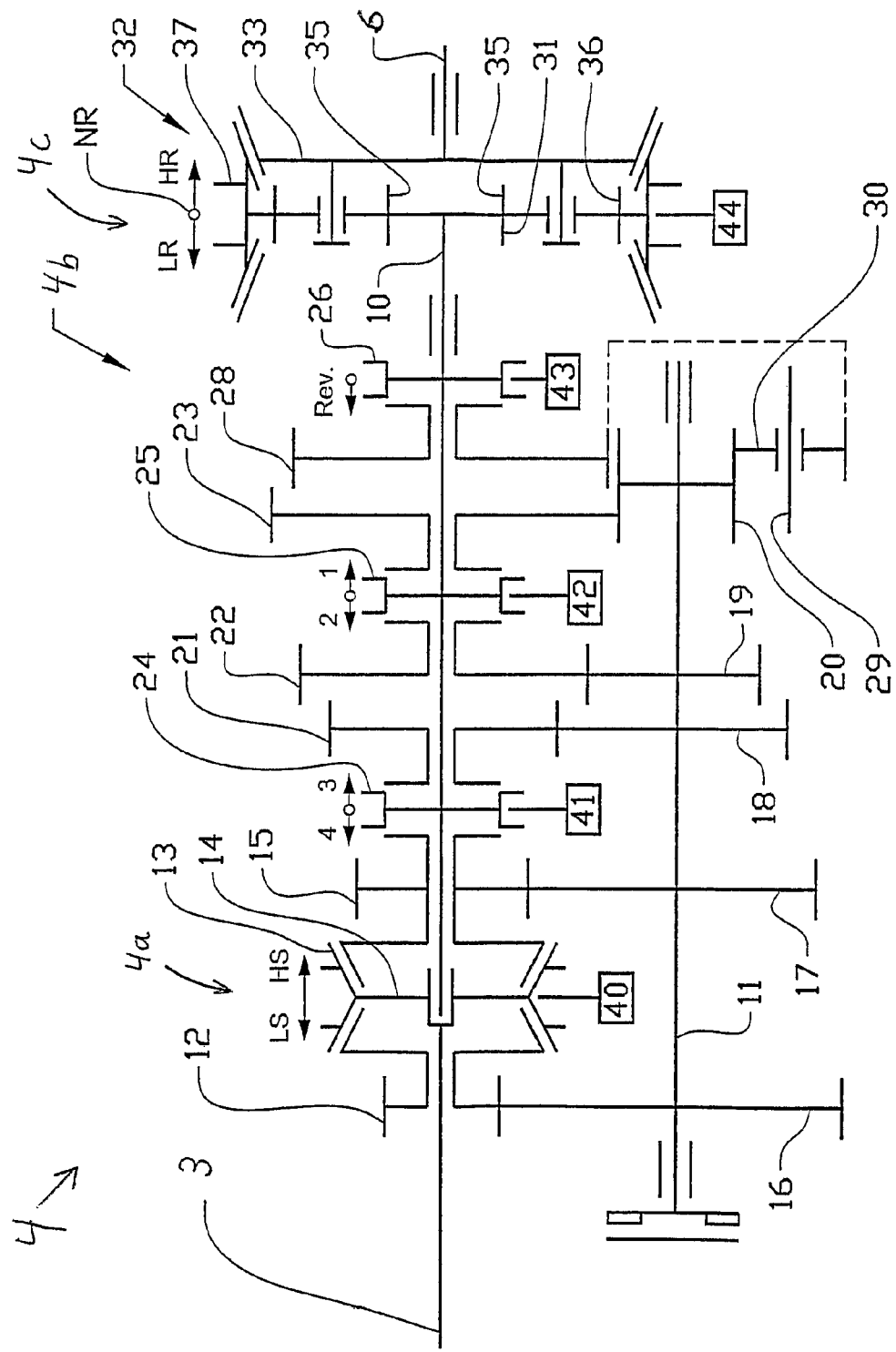
FIG. 2 Describes a gearbox suitable for the present invention

In FIG. 2 is shown a Mechanical Transmission (MT) 4 suitable for the present invention and which is for example used in trucks. A gear wheel 12 is mounted rotatably on the input shaft 3, i.e. the output shaft 3 from the ICE 2 in FIG. 1, and is lockable on the shaft by means of an engaging sleeve 13 which is provided with synchronizing means and is mounted non-rotatably but axially displaceably on a hub 14 connected non-rotatably to the input shaft 3. By means of the engaging sleeve 13, a gear wheel 15 mounted rotatably on the main shaft 10 is also lockable relative to the input shaft 3. The gear wheels 12 and 15 engage with gear wheels 16 and 17, respectively, which are connected non-rotatably to the intermediate shaft 11. Arranged in a rotationally fixed manner on the intermediate shaft 11 are further gear wheels 18, 19 and 20 which engage with gear wheels 21, 22 and 23, respectively, which are mounted rotatably on the main shaft 10 and are lockable on the main shaft by means of engaging sleeves 24 and 25, respectively, which, in the illustrative embodiment shown, do not have synchronizing arrangements. However, these sleeves may also be provided with a synchronizing arrangement if desired. A further gear wheel 28 is mounted rotatably on the main shaft 10 and engages with an intermediate gear wheel 30, which is mounted rotatably on a separate shaft 29 and engages in turn the intermediate shaft gear wheel 20. The gear wheel 28 is lockable on its shaft by means of an engaging sleeve 26.

The gear wheel pairs 12, 16 and 15, 17 and also the engaging sleeve 13 form a split gearing 4*a* with a low gear stage LS and a high gear stage HS.

The gear wheel pair 15, 17 also forms, together with the gear wheel pairs 21, 18, 22, 19, 23, 20 and 28, 30, a basic main gearbox 4*b* with four forward gears and one reverse gear. Arranged in a rotationally fixed manner on the output end of the main shaft is a gear wheel 31 which forms the sun gear in a two-stage range gear 4*c* of the planetary type designated by reference number 32, the planet wheel carrier 33 of which is connected in a rotationally fixed manner to a shaft 34 which forms the output shaft of the gearbox. The planet wheels 35 of the range gear 32 engage with a ring gear 36, which, by means of an engaging sleeve 37, is lockable relative to a gearbox casing for low range LR and relative to the planet wheel carrier 33 for high range HR. The engaging sleeve also has a neutral position NR between the gear positions LR and HR. In the neutral position NR the output shaft 34 is released from the main shaft 10.

The engaging sleeves 13, 24, 25, 26 and 37 are displaceable as shown by the arrows in FIG. 2, to provide the gear stages shown next to the arrows (step 602 in FIG. 6). The displacement is brought about by servo devices 40, 41, 42, 43 and 44 which are indicated diagrammatically in FIG. 2 and may be pneumatically operated piston/cylinder arrangements of the type used in a gearbox of the type described above. The servo devices are controlled by the ECU 9 (FIG. 1), comprising a microcomputer, depending on signals fed into the control unit representing the various engine and vehicle data such as for example engine speed, vehicle speed, throttle pedal position, engine brake on/off and indicated whether manual shifting or automatic control shifting is desired. The ECU 9 may also control fuel injection, that is to say the engine speed, depending on the throttle pedal position and if the clutch 5 (FIG. 1) is engaged or disengaged.

The MT 4 described in FIG. 2 is only an example of a transmission system suitable for the present invention and the inventive idea with having a specific gear shift strategy is applicable to any gear shift system. The system described in FIG. 2 may be modified for example concerning the number and location of the synchronizations such that the synchronized gear used for the synchronization in the present invention may be located in the main gearbox or in the split gearing arrangement or in the range gear arrangement.

Figure 3:
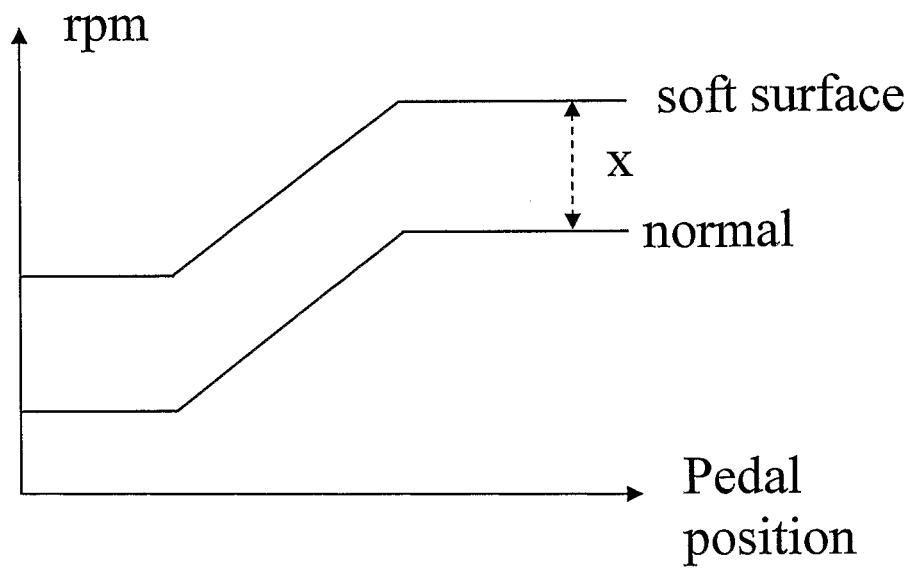
FIG. 3 A diagram showing an example of the gear shift limits for shifting up in a first normal shift mode and in a second soft surface shift mode according to the present invention FIG. 4 A diagram showing another example of the gear shift limits for shifting up in a first normal shift mode and in a second soft surface shift mode according to the present invention FIG. 5 Describes a schematic view of a computer control system suitable for the present invention.

FIG. 3 discloses a diagram with accelerator pedal position on the x-axis and engine rotational speed on the y-axis. The two curves indicate engine rotational speeds for an upshift performed according to said normal shift mode and according to said soft surface shift mode from the same gear. As can be seen an upshift performed according to the soft surface shift mode is performed at a higher engine rotational speed. The rotational speed difference x between the two different modes for an upshift from a certain gear is according to this embodiment the same for all accelerator pedal positions.

Figure 4:
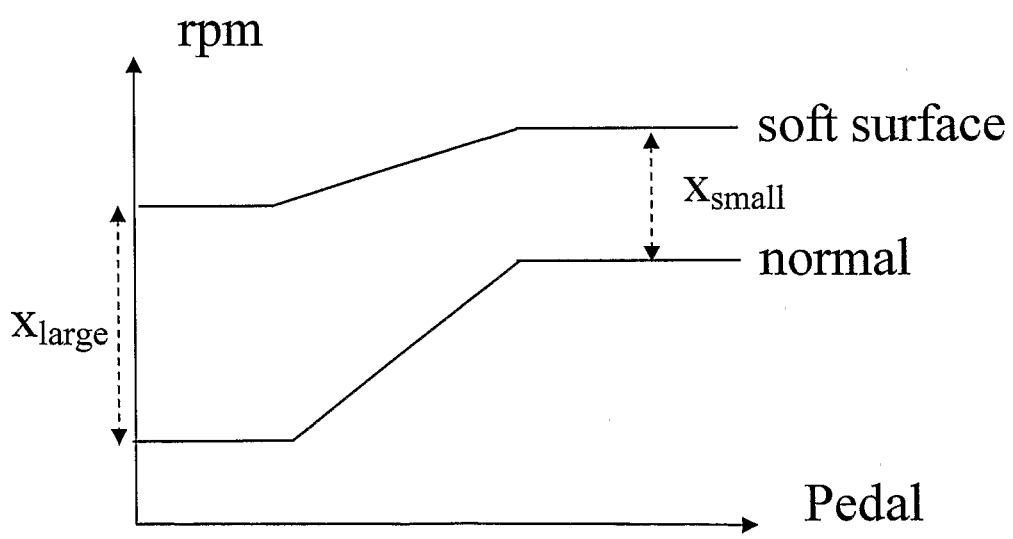

FIG. 4 discloses another diagram with accelerator pedal position on the x-axis and engine rotational speed on the y-axis according to another embodiment of the invention. This diagram corresponds to the diagram in FIG. 3 except for that here the rotational speed difference x between said normal shift mode and said soft surface shift mode for an upshift from a certain gear is according to this embodiment different at different accelerator pedal positions. At small depressions of the accelerator pedal the speed difference is larger (xlarge) compared to when the accelerator pedal is depressed more (xsmall). This has the advantage that when an upshift is performed it can be avoided to end up at too low engine rotational speeds after an gear upshift. This also gives the driver the possibility to adapt the speed of the vehicle over a broader vehicle speed interval without having a gearshift.

This can be advantageous if the driver takes a run before driving up a hill or have to slow down a bit before a turn.

Figure 5:
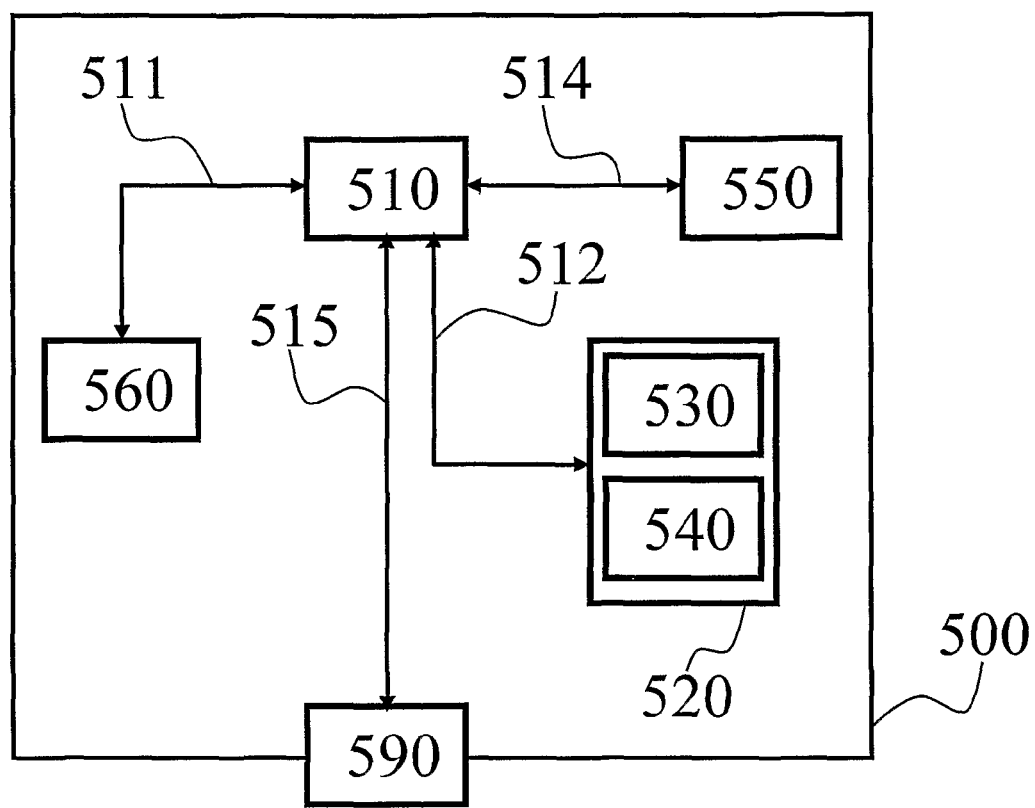

The present invention also relates to a computer program, computer program product and a storage medium, all to be used with a computer for executing said method and FIG. 5 shows the invention applied on a computer arrangement.

FIG. 5 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the ECU 9. The data-processing unit 510 can comprise, for example, a microcomputer.

The memory 520 also has a second memory part 540, in which a program for controlling the drive train system according to the invention is stored. In an alternative embodiment, the program for controlling the drive train system is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 315.

The method according to the present invention can be executed by the data-processing unit 510 by the data-processing unit 510 running the program stored in the memory 540 or the program stored in the nonvolatile recording medium 550.

The invention should not be deemed to be limited to the embodiments described herein, but rather a number of further variants and modifications are conceivable within the scope of the following patent claims. Hence, the above described logic system is only an example of how to implement the drive train control system into a vehicle and there are several other options obvious to the skilled person in the art of how to implement the invention in a vehicle which are within the scope of the inventive idea in this application.

The invention claimed is:

1. A powertrain system for a vehicle comprising
an automated master clutch;
a stepped gearbox;
the master clutch being configured to control driving torque from an engine to an input shaft of the stepped gearbox;
the stepped gearbox comprising a plurality of gear wheel pairs providing multiple fixed gear staves that are obtainable by a plurality of axially displaceable engaging sleeves; and
a control unit adapted to control the master clutch and the stepped gearbox,
the control unit being programmed to generate a control signal indicating a desired gear selection,
the control unit comprising at least two different sets of gear selection control algorithms for generating the gear selection control signal, the control algorithms comprising engine rotational speed limits for when to upshift or downshift and for which gear to select and engage, the different gear selection control algorithms generating different gear selection control signals based on input data,
the control unit further being connected to a gear selection control algorithm selector which indicates which gear selection control algorithm of the different control algorithms is to be used by the control unit, the different gear selection control algorithms comprising at least a first gear selection control algorithm in which the control unit sends signals for shifting gears in the stepped gearbox when driving the vehicle in a normal mode corresponding to the conditions on an ordinary road, and at least a second gear selection control algorithm in which the control unit sends signals for shifting gears in the stepped gearbox when driving the vehicle in a surface mode, the second gear control algorithm being arranged to provide a higher vehicle driving force than the first gear selection control algorithm,
wherein the control unit is programmed to register input data including at least prevailing travel resistance and traction wheel slip, and where if the travel resistance is higher than a predetermined value and if the traction wheel slip is higher than another predetermined value, the control unit is programmed to generate control signals to control according to the second gear selection control algorithm.

2. A powertrain system according to claim 1, wherein the second gear selection control algorithm causes the control unit to generate control signals to perform a shift to a selected higher gear at a higher engine speed than when the first gear selection control algorithm is used.

3. A powertrain system according to claim 1, wherein the second gear selection control algorithm causes the control unit to generate control signals to perform smaller gear shift steps when shifting up compared to when the first gear selection control algorithm is used.

4. A powertrain system according to claim 1, wherein the second gear selection control algorithm is dependent on the steering angle such that there is an increased engine speed limit for changing a gear when there is an increased steering wheel angle.

5. A powertrain system according to claim 4, wherein an upshift is not allowed when the steering angle is above a predefined limit.

6. A powertrain system according to claim 1, wherein a travel resistance value is estimated or computed from data retrieved from relevant sensors such that a control system i the vehicle predicts that when the travel resistance is above a certain level for a certain time, the powertrain shall be controlled by control unit generating control signals according to the second gear selection control algorithm, and otherwise it shall be controlled by another gear selection control algorithm.

7. A powertrain system according to claim 1, wherein the control unit comprises a look up table or a mathematical formula.

8. A powertrain system according to claim 1, wherein quicker torque ramping during a gear shift is performed when the powertrain is controlled by the second gear selection control algorithm than when controlled by the first gear selection control algorithm.

9. A powertrain system according to claim 1, wherein the powertrain comprises a split gearbox, a main gearbox and a range gear.

10. A vehicle comprising a powertrain system according to claim 1.

11. A vehicle according to claim 10, wherein the vehicle is a heavy duty vehicle.

12. A method for controlling a powertrain for a vehicle, where the powertrain comprises control algorithms for generating a gear selection control signal, and where the control algorithms comprise engine rotational speed limits for when to upshift or downshift and for which gear to select and engage, the method comprising:
controlling driving torque from an engine to an input shaft of a stepped gearbox;
providing multiple fixed gear stages of a plurality of gear wheel pairs of the stepped gearbox by a plurality of axially displaceable engaging sleeves;
registering a road condition, by registering prevailing travel resistance and traction wheel slip;
if the registered road condition corresponds to normal road conditions then shifting gears in the stepped gearbox according to a first gear selection control algorithm for driving the vehicle in a normal mode corresponding to the conditions on an ordinary road; and
if the registered road condition corresponds to soft surface road conditions, where the travel resistance is higher than a predetermined value and the traction wheel slip is higher than another predetermined value, then shifting gears in the stepped gearbox according to a second gear selection control algorithm for driving the vehicle in a soft surface mode corresponding to the conditions on a soft surface road, the second gear control algorithm being arranged to provide a higher vehicle driving force than the first gear selection control algorithm.

13. Method as in claim 12, wherein the second gear selection control algorithm is programmed to perform a shift to a selected higher gear at a higher engine speed than when the first gear selection control algorithm is used.

14. Method as in claim 12, wherein the second gear selection control algorithm is programmed to perform smaller gear shift steps when shifting up compared to when the first gear selection control algorithm is used.

15. Method as in claim 12, wherein the second gear selection control algorithm is dependent on the steering angle such that there is an increased engine speed limit for changing a gear when there is an increased steering wheel angle.

16. Method as in claim 15, wherein an upshift is not allowed when the steering angle is above a predefined limit.

17. Method as in claim 12, wherein quicker torque ramping during a gear shift is performed when the powertrain is controlled by the second gear selection control algorithm than when controlled by the first gear selection control algorithm.

18. A computer comprising program code means for performing all the steps of the method of claim 12.

19. A computer program product comprising program code means stored on a non-transitory computer readable medium for performing all steps of the method of claim 12.

20. A non-transitory storage medium for use in a computing environment comprising a computer readable program code to perform the method of claim 12.

* * * * *